United States Patent [19]

Deutsch

[11] 4,245,541

[45] Jan. 20, 1981

[54] APPARATUS FOR REDUCING NOISE IN DIGITAL TO ANALOG CONVERSION

[75] Inventor: Ralph Deutsch, Sherman Oaks, Calif.

[73] Assignee: Kawai Musical Instrument Mfg. Co., Ltd., Hamamatsu, Japan

[21] Appl. No.: 46,135

[22] Filed: Jun. 1, 1979

[51] Int. Cl.³ ........................ G06F 15/34; G10H 1/06

[52] U.S. Cl. ........................................ 84/1.22; 84/1.19; 84/1.01; 364/723; 364/724

[58] Field of Search ...................... 84/1.01, 1.22, 1.19; 364/723, 724

[56] References Cited

U.S. PATENT DOCUMENTS

| | | | |
|---|---|---|---|
| 4,020,332 | 4/1977 | Crochiere et al. | 364/723 |
| 4,111,090 | 9/1978 | Deutsch | 84/1.01 |

*Primary Examiner*—Gene Z. Rubinson
*Assistant Examiner*—Forester W. Isen
*Attorney, Agent, or Firm*—Ralph Deutsch

[57] ABSTRACT

In a musical instrument in which a plurality of data words corresponding to the amplitudes of a corresponding number of evenly spaced points defining a cycle of an audio waveform are transferred sequentially from a waveshape memory in repetitive cycles at a rate proportional to the pitch of the tone being generated, apparatus is provided for reducing undesired frequency components resulting from the conversion of the digital signals into analog musical signals. The noise reduction apparatus applies optimal amplitude weighting values to a subset of the stored data words and adds these weighted values together to provide a new single value which is used for the output signal.

17 Claims, 13 Drawing Figures

APPARATUS FOR REDUCING NOISE IN DIGITAL TO ANALOG CONVERSION

FIELD OF THE INVENTION

This invention relates to the production of musical waveshapes using digital generation systems and in particular is concerned with an improvement for reducing undesired noise in the conversion from digital to analog signals.

BACKGROUND OF THE INVENTION

There are a variety of musical tone generator systems in which the musical waveshape is first created in digital form and then converted to an analog signal for a sound system by means of a digital-to-analog converter. Representative digital tone generators of this type have been disclosed and described in U.S. Pat. No. 3,515,792, Digital Organ; U.S. Pat. No. 3,809,789, Computer Organ; and U.S. Pat. No. 4,085,644, Polyphonic Tone Synthesizer.

The simplest means, and therefore the most commonly used means, for convererting a sequence of digital numeric data into a corresponding analog waveshape is to repetitively convert the digital numbers to an analog voltage using a digital-to-analog converter. A sample and hold circuit is usually employed after such conversions so that the present current, or voltage, level is maintained at a substantially constant value until the succeeding conversion time. Such a sample and hold circuit is frquently referred to as a zero-order sample and hold. Sometimes it is also called a "box car" detector.

It is an inherent characteristic of a digital-to-analog system, wherein data is converted at periodic intervals, that the resulting analog signal has spectral components which are imaged at all integer multiples of the periodic interval of the signal conversion. This periodic interval is called the sampling period and is the period of the digital-to-analog conversion.

It is well known that a zero-order sample and hold conversion system will produce an output signal spectrum which is clustered about multiples of the sampling period and that the original input spectrum (assuming that the sampling period is sufficiently high so that there is no fold-over or aliasing) will be multiplied by a spectral amplitude factor of the form $$G(f)=T\sin(\pi fT)/\pi fT \qquad \text{(Equation 1)}$$

where T is the sampling period. A discussion of this well-known property can be found on page 135 of the book:

Cooper, G. R. and Clare D. McGillen, *Methods of Signal and System Analysis.* New York, Holt, Rinehart and Winston, Inc., 1967.

The effectiveness of a zero-order sample and hold circuit as an interpolation means for a digital-to-analog conversion depends upon the relative value of the sampling period T in comparison to the highest frequency component in the spectral content of the input digital data sequence. As a general rule, the higher the sampling frequency $f_s=1/T$ in comparison with the highest frequency component in the digital sequence, the better will be the suppression of undesired, or noise components in the signal output spectrum.

The term noise is used herein in a genereric sense to encompass components of the waveshape that are undesired. For example, if one of the referenced digital tone generators is intended to produce a specified tone color having 16 harmonics, then any additional harmonics produced by the digital-to-analog conversion system are considered to be noise. It is evident that such noise, which may consist of an extra harmonic, in some situations may not produce a disagreeable or objectionable sound. However, in many situations the "extra" harmonics can be very objectionable and can produce overtones which are too far removed in frequency from the pitch of the desired tone to be considered acceptable even if they may not be characterized as being disagreeable to a listener.

FIG. 1 shows a typical spectral curve for the output signal from a zero-order sample and hold circuit. The lower graph illustrates the waveshape produced by converting the sequence of digital numbers and maintaining a constant signal amplitude between the sampling times. The waveshape is synthesized from a periodic sequence having 32 equal harmonics. The upper graph is the output spectrum and exhibits the characteristic amplitude variation of the form sinx/x corresponding to Equation 1. The higher harmonic clusters only decrease very gradually with the higher frequencies.

An obvious and commonly used method to reduce the large number of undesired sampling harmonics is to employ a low pass filter following the zero-order sample and hold circuitry. The practical implementation problem is to design a low-pass filter having a sufficiently sharp cut-off so that it only attenuates the undesired frequencies without affecting the desired harmonics while still retaining a short transient time response. While low-pass filters have been used in digital-to-analog conversions systems they generally do not provide a feasible noise reduction system for musical generators of the above referenced types. For these musical generators, the cut-off frequency of the low-pass filter should be changed for each fundamental of the generated tone. Some simplification can be attained by changing the cut-off frequency only as a function of the octave in which the fundamental falls.

A noise reduction system intended for use with a digital-to-analog tone conversion system is described in the inventor's U.S. Pat. No. 4,111,090 entitled "Noise Reduction Circuit For A Digital Tone Generator." The system disclosed in the referenced patent achieves an improved attenuation characteristic for a zero-order sample and hold circuit used with a digital tone generator. The improvement does not require increasing the number of data points in each fundamental period of the tone geing generated. The improvement is obtained by providing a circuit for implementing linear interpolation between successive digital data points. In one embodiment described in U.S. Pat. No. 4,111,090, at least seven additional data points are inserted by an interpolation between each two consecutive data points of the original sequence of data points constituting the musical waveshape. The sampling rate is thereby effectively increased by a factor of eight. This is accomplished by providing a circuit arrangement in which stored data words defining the amplitudes of a succession of sample points for the waveshape are transferred successively to first and second registers at a rate determined by the fundamental pitch of the note being generated. In addition, data words as they are transferred from the first register to the second register are also transferred to the input of a digital-to-analog converter at the same predetermined rate. A subtracting and dividing means coupled to the first and second registers generates an output signal proportional to the difference in value between the digital words in the two registers. This difference signal is used to repeatedly increment the value of the input from the first register before it is applied to the digital-to-analog converter.

It is an object of the present invention to further reduce the residual noise at the output of the digital-to-analog converter to a level below that attainable with either a zero-order sample and hold circuit or such a circuit in combination with a linear interpolation system such as that described in U.S. Pat. No. 4,111,090. It is also an object of this invention to decrease the output noise without increasing the clock rates to a frequency higher than would be used to implement a system according to the referenced patent.

It is known in the signal theory art (i.e. page 158 of the above referenced book), that if a signal has frequencies f limited to a finite range of values such as $-W \leqq f \leqq W$, and if this signal is known only at discrete intervals of time $t_n=n/2W$, $-\infty<n<\infty$ then the original continuous signal f(t) can be completely recovered from the set of discrete samples f(n/2W) by summing weighted values of the discrete samples according to the relation $$f(t) = \sum_{n=-\infty}^{\infty} f(n/2W)\sin[2\pi(2Wt-n)]/[2\pi(2Wt-n)] \quad \text{(Equation 2)}$$

Equation 2 can be written in the general form $$f(t) = \sum_{n=-\infty}^{\infty} f(n/2W)g(2Wt-n) \quad \text{(Equation 3)}$$

where g(2Wt−n) represents the weighting function used to smooth the discrete signal amplitude values f(n/2W). Thus, at least in theory, the continuous smoothed signal function f(t) can be perfectly recovered without any extraneous sample noise if all the values of f(n/2W) are simultaneously known for all time (complete past, present, and future) and if the weighting function g(2Wt−n) is also known and is applied for all time.

If f(t) is a periodic function, which is the case for the tone generators described in the above referenced patents, then the knowledge of the sample points for a single period of the waveform is exactly equivalent to having complete knowledge of the sample points for all time. With appropriate choices for the number of sample points per waveshape period and choice of the weighting function, a finite form of Equation 2 can be employed to reconstruct a musical waveshape from an input set of discrete samples represented by a sequence of digital values.

DETAILED DESCRIPTION

Figure 2:
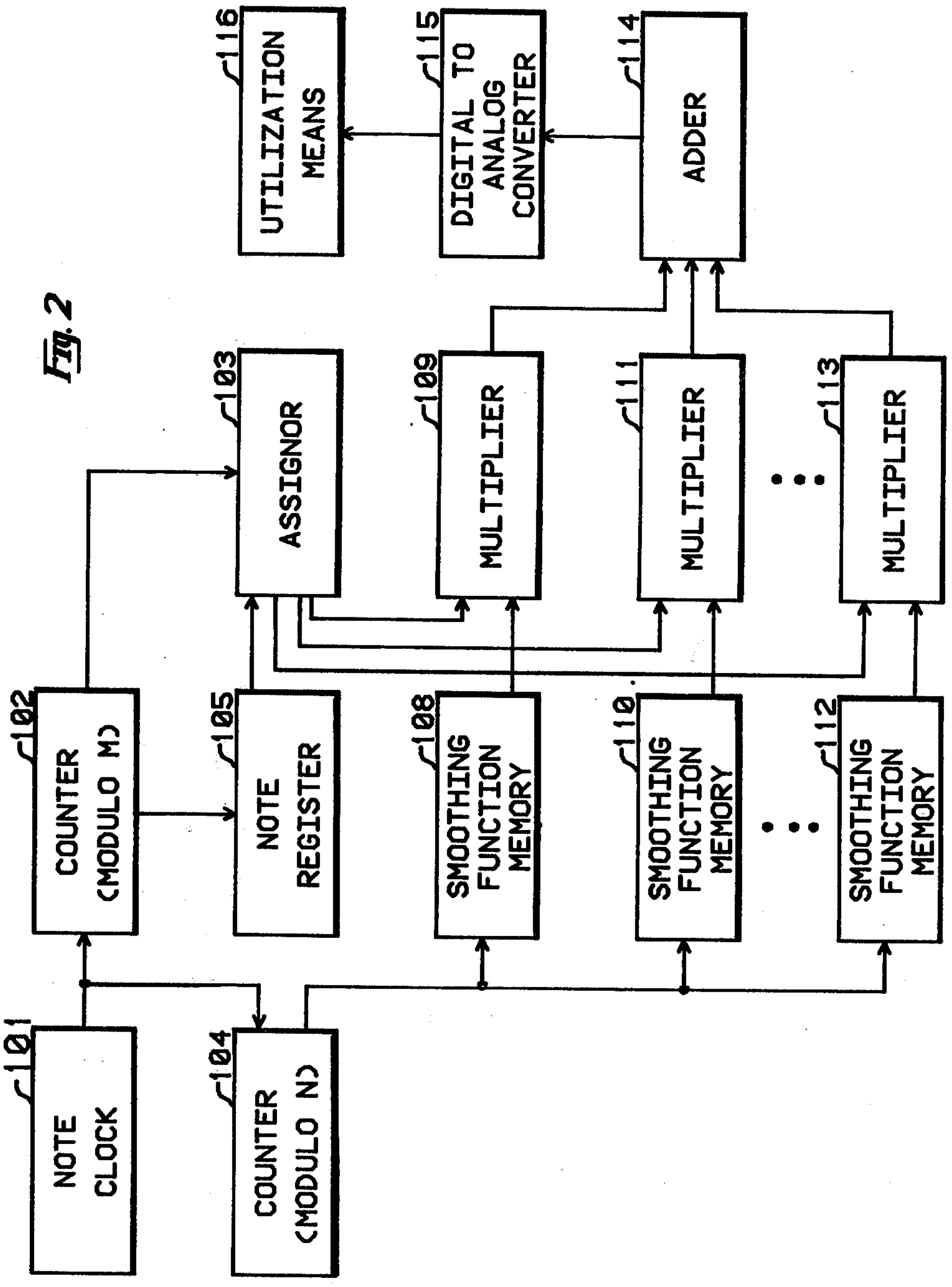
FIG. 2 is a schematic diagram of an embodiment of the invention.

FIG. 2 shows an embodiment of the present invention which reduces the sampling noise produced by the digital-to-analog converter 115 which is used to convert input digital data into an output analog signal.

The digital data representing the successive point on a complete cycle are stored in the note register 105. This data can be generated in a number of ways. One manner of generating the points for a cycle of a musical waveshape is described in detail in U.S. Pat. No. 4,085,644 entitled Polyphonic Tone Synthesizer and which is hereby incorporated by reference.

In the preferred embodiment the data set in note register 105 consists of 64 data words. These data words are accessed from the note register 105 in response to signals created by the counter 102 in the manner described in the above referenced patent.

Advantageously the frequency of the note clock is selected to be 64×8=512 higher in frequency than the fundamental frequency of the desired musical note pitch. There is no special requirement imposed on the note clock which can be implemented by a selection from a variety of well known systems. One such implementation of a note clock suitable for musical tone generation systems is described in detail in U.S. Pat. No. 4,067,254 which is hereby incorporated by reference.

Counter 102 is used to count the signals from the note clock 101 and is implemented to count modulo 8.

The best noise reduction will be attained when the smoothing operation is applied simultaneously to all the available 64 data points. There are 64 smoothing function memories shown implicitly by the systems blocks numbered 108, 110, and 112. There are 64 multipliers associated with the 64 smoothing function memories. The multipliers are shown implicitly by the system blocks numbered 109, 111, and 113.

Each smoothing function memory contains 64×8=512 data words calculated according to the relation $$x_n = \sin(\pi n/16)/(\pi n/16) \quad \text{(Equation 4)}$$

for integer values of the index n ranging from −256 to +255. The data stored in each of the smoothing function memories is staggered by eight smoothing function data points in the manner shown in FIG. 3. The first smoothing function memory 108 has the smoothing function stored starting at the maximum value. The second smoothing memory 110 has the data stored with the maximum starting in a position eight data words preceding the corresponding data values stored in smoothing function memory 108. The smoothing data is stored modulo 256 so that the data "loops-back" on itself in the manner shown in FIG. 3. The same back spacing of eight data words is used successively for the remainder of the set of 64 smoothing function memories. It is noted that the phase spacing of eight data words places the first minimum value in each smoothing function memory at the same data word location as the maximum value of the data in the immediately preceding memory.

The smoothing function data for each memory is computed from Eq. 1 and is placed into memory according to the index number (n+jh). j is a number which designates a particular smoothing function memory. h is called the phase offset number. For the case illustrated in FIG. 3, h has the value 8. The index number (n+jh) is a number modulo 256, or more generally is modulo the number of data words in a smoothing function memory.

For the first embodiment of the invention which produces the minimum output sampling noise from the digital-to-analog converter, counter 104 counts the signals from the note clock 101 modulo 1. Obviously in this embodiment, counter 104 serves no purpose and is only shown in FIG. 2 in anticipation of an alternative system configuration which is described below.

Figure 4:
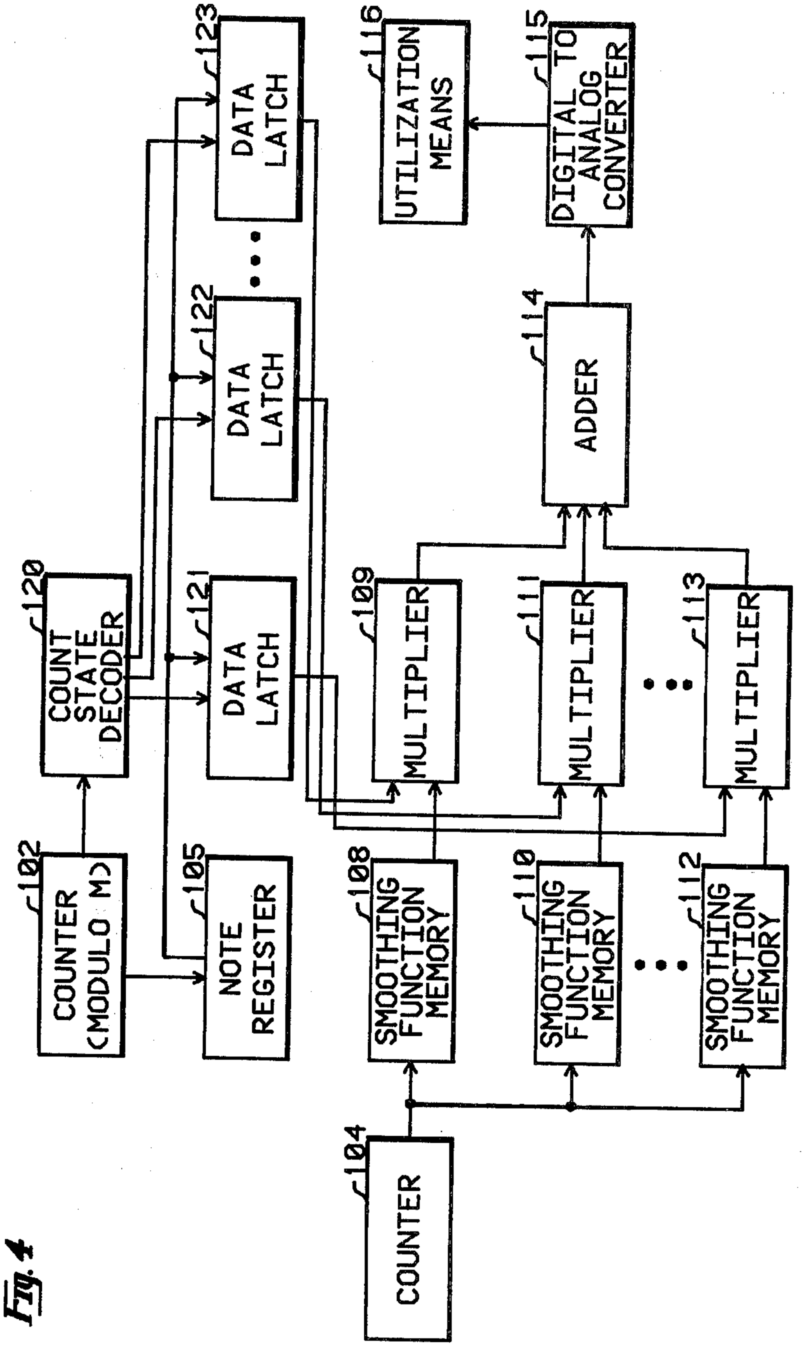
FIG. 4 is a schematic diagram showing details of the assignor.

Assignor 103 receives the data words which are successively and repetitively read out of note register 105 and selectively directs the data to a member of the set of multipliers 109 through 113. Details of the assignor are shown in FIG. 4 and are described later.

Assignor 103 directs the first word received from the note register to multiplier 109, and such direction is made in a cyclic order of assignment for the succeeding words so that the 64th word is directed to multiplier 113. The assignment process is iterated for each cyclic addressing of the waveshape data from note register 105 under control of the counter 102.

At each timing signal generated by note clock 101, the output data words from note register 105 are multiplied by smoothing data values addressed from the smoothing memories in response to the note clock. The smoothing memories each contain address decoding means such that the the stored data is read out modulo 256 in response to the note clock timing signals. The product data, or product values, at the output from the set of 64 multipliers is summed in adder 114. Adder 114 is a set of conventional digital adders which produce an output equal to the sum of all the input data. The output summed data points from adder 114 is converted to an analog signal by means of the digital-to-analog converter 115. The output analog signal is then furnished to the utilization means 116. For most musical instrument systems, the utilization means consists of conventional amplifiers and sound reproducing apparatus. The system timing is such that eight output weighted values are furnished for each data word addressed out from the note register 105.

Figure 1:
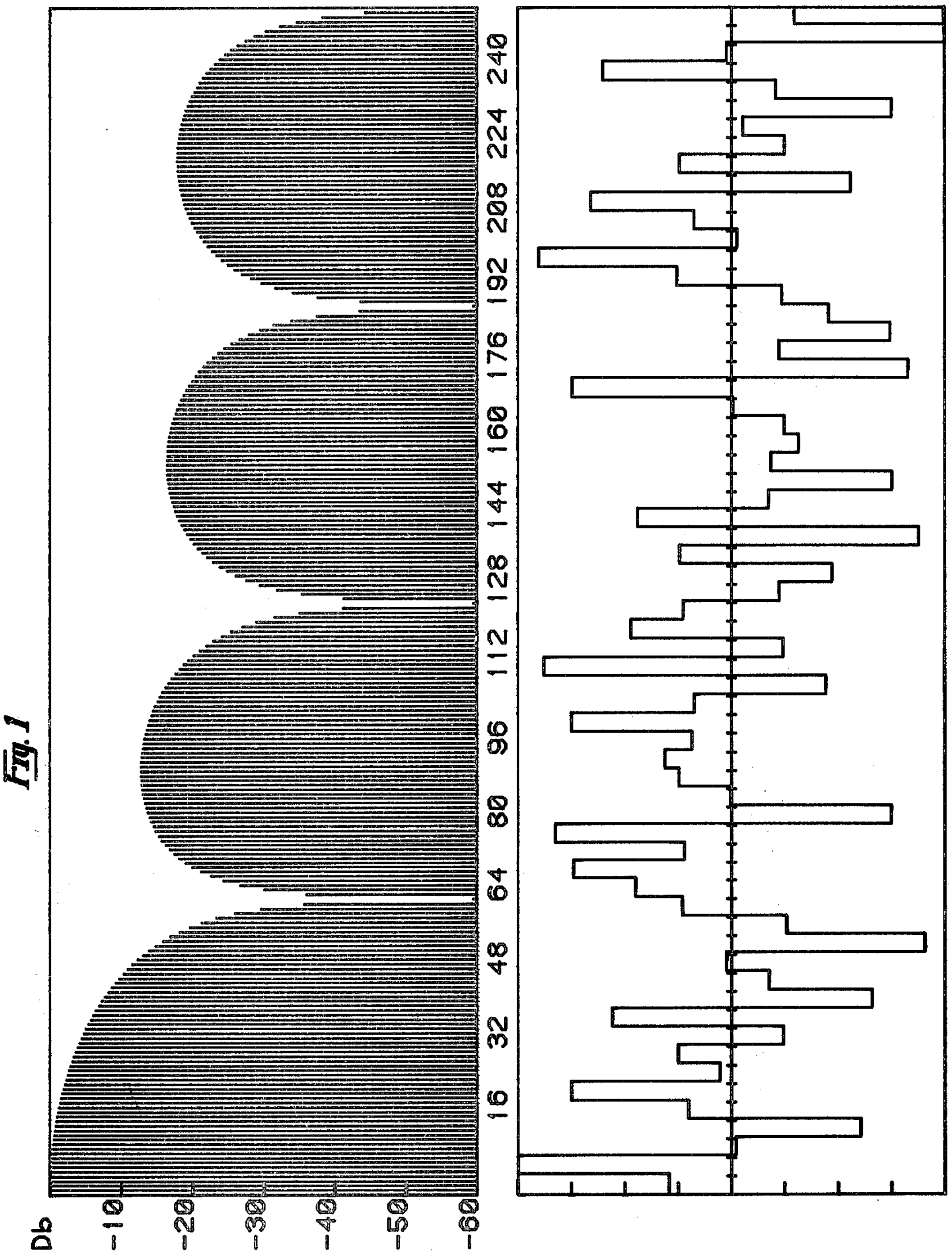
FIG. 1 is a drawing which illustrates the harmonic series generated by a zero-order sample and hold circuit.
Figure 5:
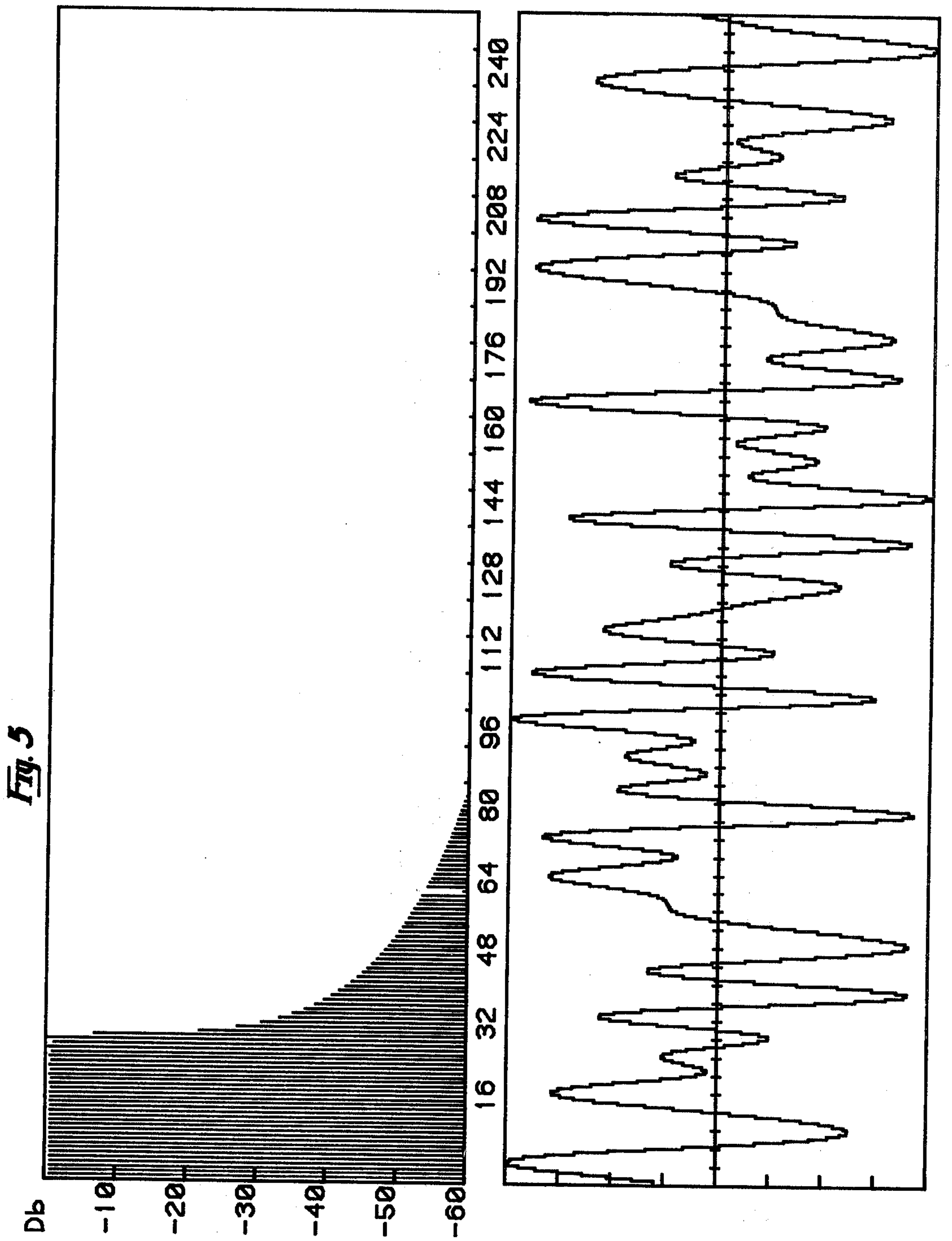
FIG. 5 is a drawing which illustrates typical harmonic noise reduction attainable with the invention.

FIG. 5 illustrates the typical sample noise reduction obtained by the system shown in FIG. 2. The wave shape data stored in note register 105 corresponds to that shown in FIG. 1. The lower graph in FIG. 5 represents the output wave shape data from the digital-to-analog converter 115 and the upper curve is the corresponding harmonic spectra. The efficiency of the sampling noise reduction is evident from a comparison of the upper graph in FIG. 1 which shows the input spectra and the upper graph in FIG. 5 which shows the output spectra. The waveshape data stored in note register 116 consisted of a waveshape of 64 points synthesized from 32 equal harmonics.

It is evident that the invention does not require that data be stored in note register 105. Note register 105, and its memory addressing from counter 102 can be eliminated and replaced with any sequence of input digital points. The main requirement is the timing relation between the arrival of the digital data and the addressing of smoothing data values from the smoothing function memories. Thus for each interval between input data points the smoothing function memories must be addressed at eight equal time increments.

An alternative implementation to the system previously described is to limit the operation so that the data smoothing is applied to less than the complete set of 64 available data points. It has been found that fairly good sampling noise reduction is obtained by using 8 data point smoothing. The motivation for reducing the number of data points is to obtain the economy of reducing the set of 64 multipliers and smoothing function memories to a set of 8.

FIG. 4 shows a sampling data smoothing system employing 8 data point smoothing. FIG. 4 also illustrates the details of the assignor 103. Counter 102 is incremented by the note clock 101 and counts modulo 8. Count state decoder 120 decodes each state of counter 102 to a set of eight individual signals. The data words read out of note register 105 are applied as an input to the entire set of eight data latches which are shown symbolically as 121 to 123.

If a signal from the count state decoder is "1", then the data point currently read out from the note register 105 is used to replace the current data contained in the corresponding data latch to which the "1" signal was directed. In this fashion the first data word read out from the note register is caused to be stored, or latched, in data latch 121. The second data word will be stored in the next data latch 122 and so on until the eighth data word is stored in data latch 123. The next word, or word number 9, read out from the note register will be stored in data latch 121, word number 10 will be stored in data latch 122, and so on to constitute a cyclic order for assignment. The data latches can be implemented as registers which are clocked to accept data at the time determined by the output signals from the count state decoder 120.

The assignor 103 comprises the count state decoder 120 and the set of data latches 121 through 123. The number of data latches is equal to the number of data points to be used in the data smoothing operation.

For the system configuration shown in FIG. 4, the smoothing function memories 108 through 112 all contain 64 data words. Therefore, counter 104 is implemented to count timing signals from note clock 101 modulo N=8. The smoothing data values are computed according to the relation $$x_n = \sin(\pi n/8)/(\pi n/8) \quad \text{(Equation 5)}$$

for integer values of the index n ranging from −32 to 31. The data in each smoothing function memory is also displaced in a manner analogous to that shown in FIG. 3. The smoothing function data in these memories are indexed according to the index number (n+jh) which has been previously defined.

The sampling noise reduction obtained with data smoothing on eight simultaneous points is not as much as that obtained with simultaneous data smoothing with the full waveshape set of 64 points. However the sample noise reduction with 8 data points is a very large improvement over that obtained with a zero-order sample and hold. The advantage of reducing the system from 64 smoothing points to 8 lies in the reduction of the number of data smoothing memories and their associated multipliers.

Figure 6:
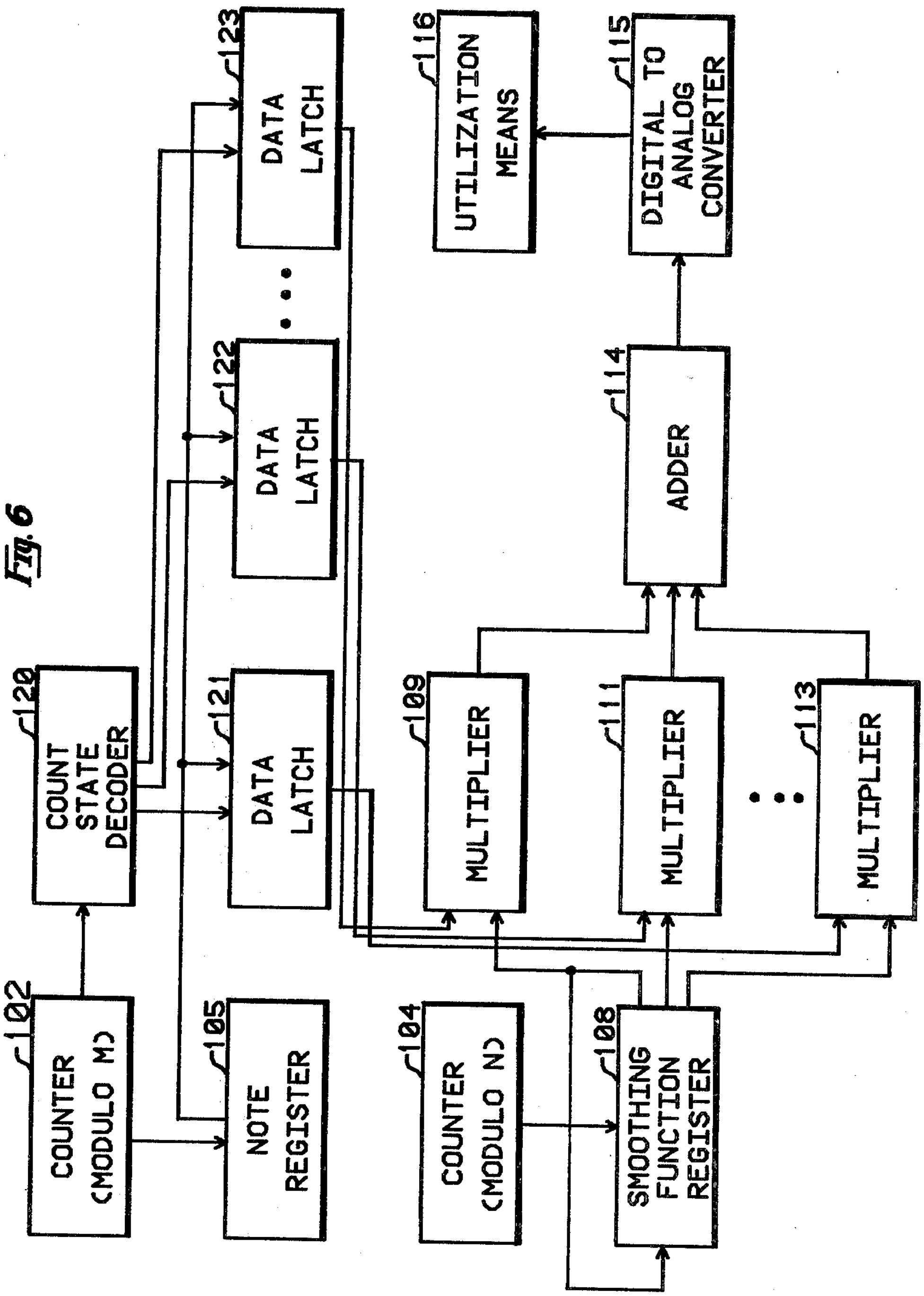
FIG. 6 is a schematic drawing of an alternative implementation of the invention using a single smoothing function memory.

FIG. 6 shows an alternative implementation to the system shown in FIG. 4 and previously described. The improvement illustrated in FIG. 6 lies in the substitution of a single smoothing function memory for the set of such memories employed in the system shown in FIG. 4.

The data smoothing values are stored in a smoothing function shift register 108 which is operated in the usual end-around mode of read/write operation for a shift register. A set of output data points are provided on the smoothing function shift register so that eight simultaneous data points are available for a data spacing of eight smoothing data points.

Instead of using a shift register for the smoothing function data, an addressable read-out memory can be used.

Figure 7:
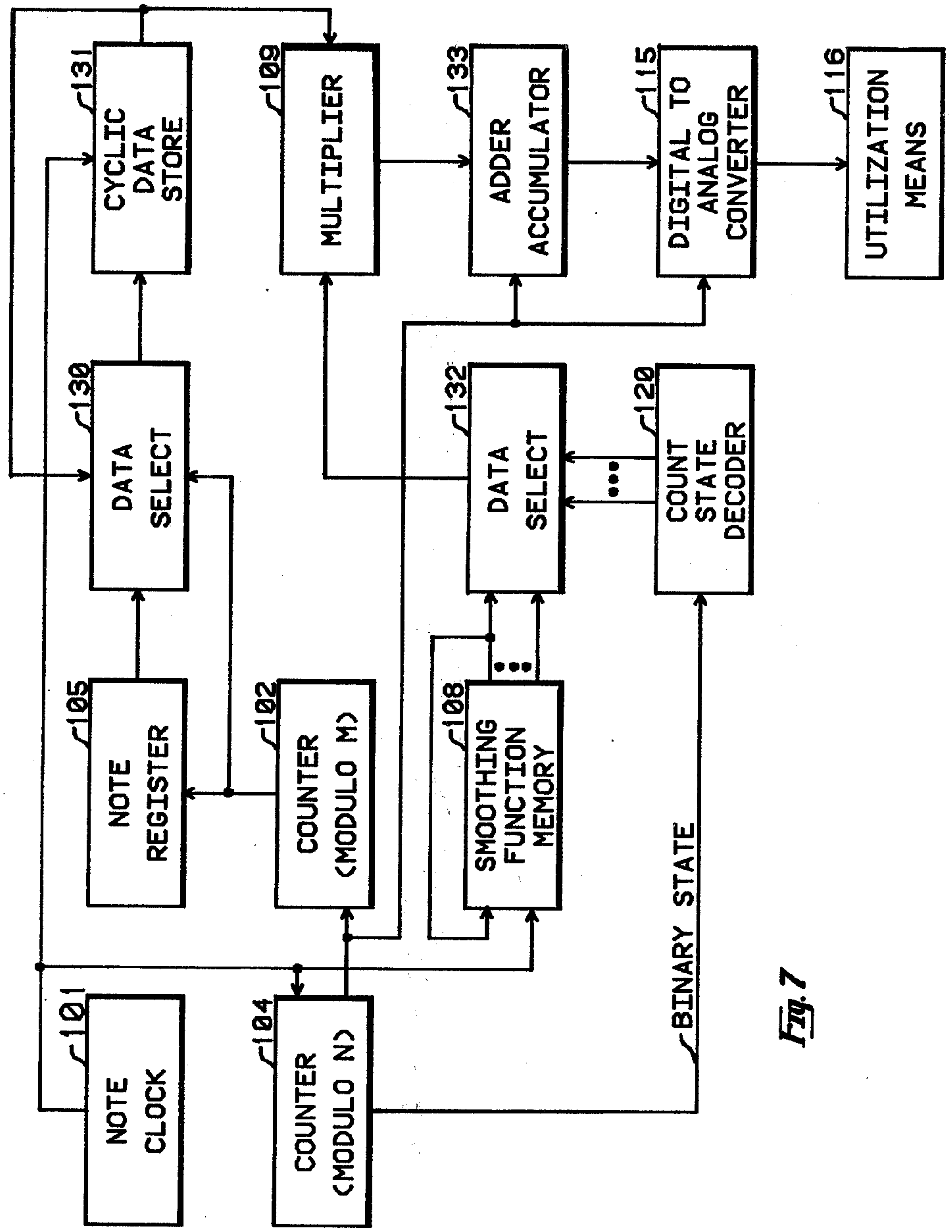
FIG. 7 is a schematic drawing of an alternative implementation of the invention requiring using a single smoothing function memory and a single time shared multiplier.

The system shown in FIG. 7 is that of a preferred embodiment of the invention for a configuration in which the data smoothing operations are implemented on the digital data words before they are converted to analog signals by the digital-to-analog converter 115. The improvement embodied in the system shown in FIG. 7 lies in the use of a single smoothing function memory 108 coupled with a single multiplier 109. The operation of a single smoothing function memory 108 with multiple spaced output signals is shown in FIG. 6 and has been previously described.

The operation of the system shown in FIG. 7 is described for data smoothing with 8 simultaneous input data points. THe system can be readily extended to other numbers of input data points.

For illustration, note register 105 contains 64 data points which constitute a full cycle for the musical waveshape.

Cyclic data store 131 is a shift register operated in an end-around mode that is advanced at a rate determined by the timing signals generated by the note clock 101. The cyclic data store contains 8 data words. These 8 data words are the current data words on which the smoothing operation is implemented. The data residing in the cyclic data store will be circulated 64 times during the time interval during which data is read out of the note register 105.

Data select 130 is responsive to signals generated at each change in the count state of counter 102. In the absence of a count state change signal, data select 130 transfers the words read out of the cyclic data store 130 to the input terminals of the same register so that the usual end-around shift register operation mode is implemented. When a count state change signal is received by data select 130 from the counter 102, the new data point now read out from the register 105 is used to replace the current data point read into data select 130 from the cyclic store 131. In the described fashion, the cyclic data store 131 will always contain and circulate the most recent eight data points addressed out from the note register 105.

The smoothing function memory 108 contains 64 data points which are computed according to Equation 5. The accessed output data from this memory are 8 simultaneous data points which are spaced, or phased, by 8 data words. The accessed output data are transmitted to data select 132.

The smoothing function memory 108 can be implemented equally as well as either a RAM (read only memory) or as a shift register operated in an end-around mode.

The state count decoder 120 receives the current binary state of the counter 120 and decodes this state number into a set of 8 individual state lines. The set of 8 state lines are used to selectively actuate data select logic circuitry in the data select 132. The net result is that for each state of the counter 104, a corresponding output data point from the smoothing function memory is selected and the selected data smoothing value point is transmitted via data select 132 to the multiplier 109.

Because the count state decoder 120 must select smoothing data at the same rate as data is read out of the cyclic store 131, the counter 104 is implemented to count modulo N=8.

As each data point is read out of the cyclic store 131, it is multiplied by the selected smoothing data point value in multiplier 109. The resultant product value is sent to the adder-accumulator 133 which adds each successively received value to the prior sum it already contains. After eight data words have been read out of the cyclic data store 131, a reset signal generated by counter 104 causes the contents of the adder-accumulator 133 to be transferred to the digital-to-analog converter 133. The reset signal also causes the adder-accumulator to be reset to a zero value. The reset signal is generated by counter 104 each time this counter returns to its initial state because of its modulo counting action.

When the reset signal generated by counter 104 is received by the digital-to-analog converter 115, the current binary data number residing in adder-accumulator 133 is converted into an analog signal which is sent to the utilization means 116.

The versions of the invention described above accomplish the desired reduction in the magnitude of the sampling noise harmonics by means of an operation on the input digital data before a conversion is made to analog signals. This is not a limitation of the invention and the invention can also be implemented using analog techniques which operate on the signals after they have been converted from the digital form to the corresponding analog state.

Figure 8:
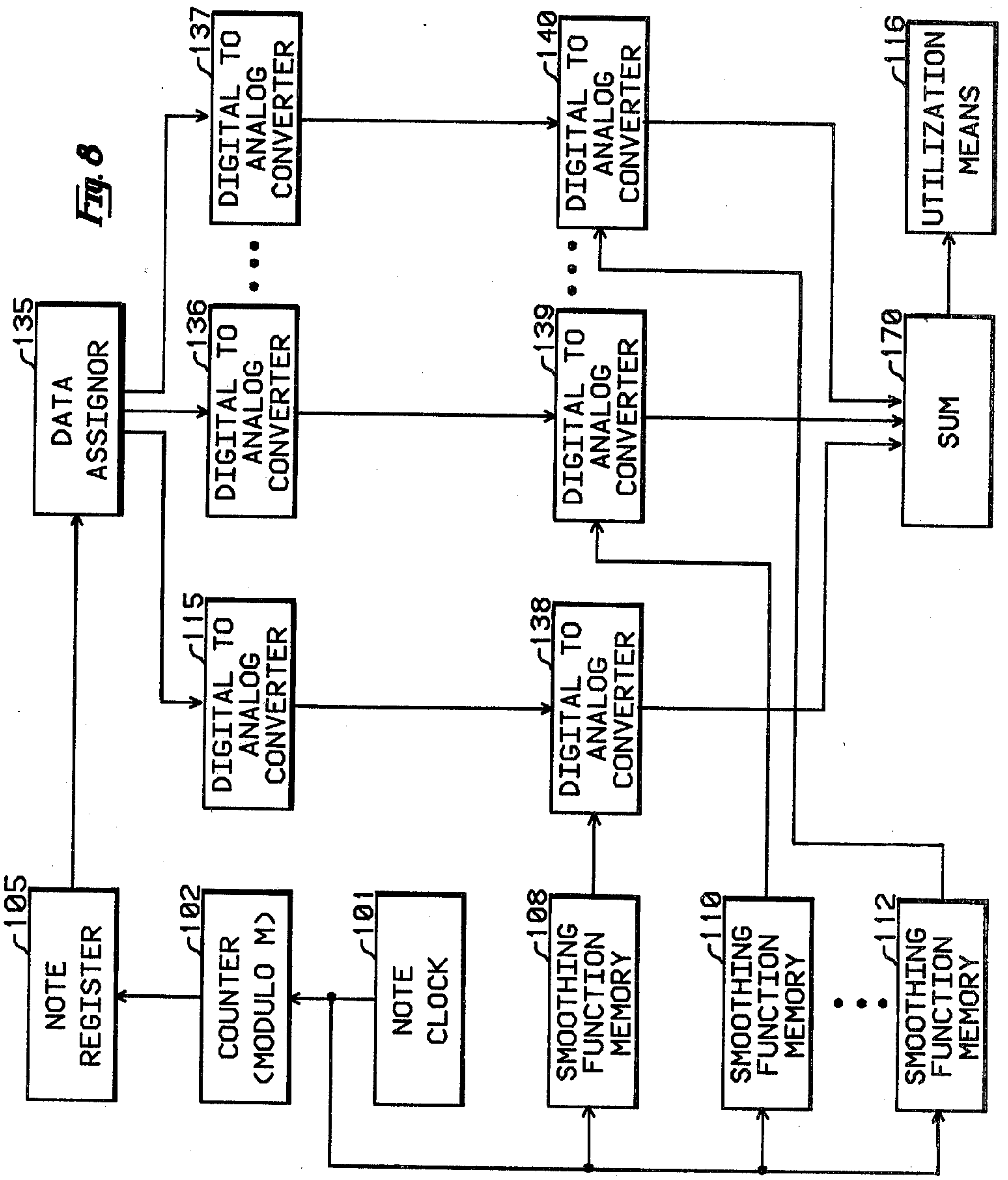
FIG. 8 is a schematic diagram of a second embodiment of the invention in which the data smoothing is incorporated after the digital-to-analog conversion.

FIG. 8 shows an implementation of the invention employing analog signal processing circuits following the conversion from digital-to-analog signals. While the system in FIG. 8 can be used for the full 64 data points, the operation is described for the case in which the data smoothing is limited to the most recent 8 data points accessed from the note register 105. The same description is readily extended to other choices for the number of data smoothed points.

The most recent 8 data points read out of the note register 105 in response to the counter 102, are assigned to the set of 8 digital-to-analog converters shown symbolically as 115, 136, and 137. The data assignor operates in the manner shown in FIG. 4 and previously described.

The smoothing function data is computed according to Equation 5 and is stored in the set of 8 smoothing function memories shown symbolically as 108–112. The data in each of the smoothing function memories are stored with a successive 8 point cyclic phase offset in the manner already described.

The data in each of the smoothing function memories is simultaneously accessed in response to the timing signals generated by the note clock 101. Associated with each of the 8 smoothing function memories is one of a set of 8 digital-to-analog converters shown symbolically as 138 to 140. These digital-to-analog converters act as multipliers because their individual reference voltages are the current analog outputs from the set of digital-to-analog converters 115 through 137. These analog outputs are called analog control signals since they effectively act to control the signal conversion gains of the corresponding digital-to-analog converters. The analog signals at the output from the set of digital-to-analog converters 138 through 140 are added together in sum 170 and then transmitted to the utilization means 116.

Figure 9:
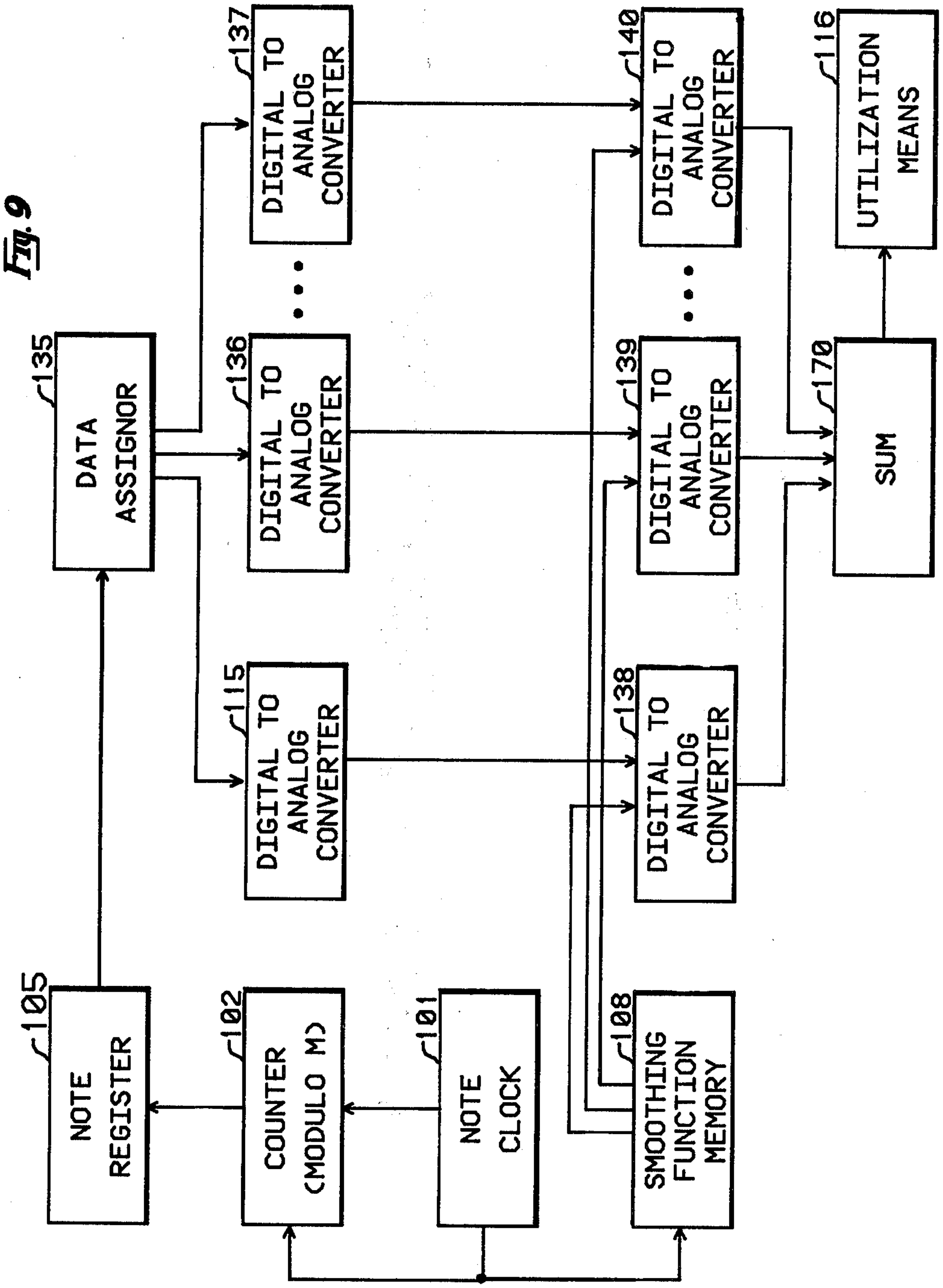
FIG. 9 is an alternative implementation to the system shown in FIG. 8 which uses a single smoothing function memory.

FIG. 9 shows an alternative implementation to the system shown in FIG. 8. In this alternative implementation the set of 8 smoothing function memories is replaced by a single memory in the analogous manner shown in FIG. 6 and previously described.

Figure 10:
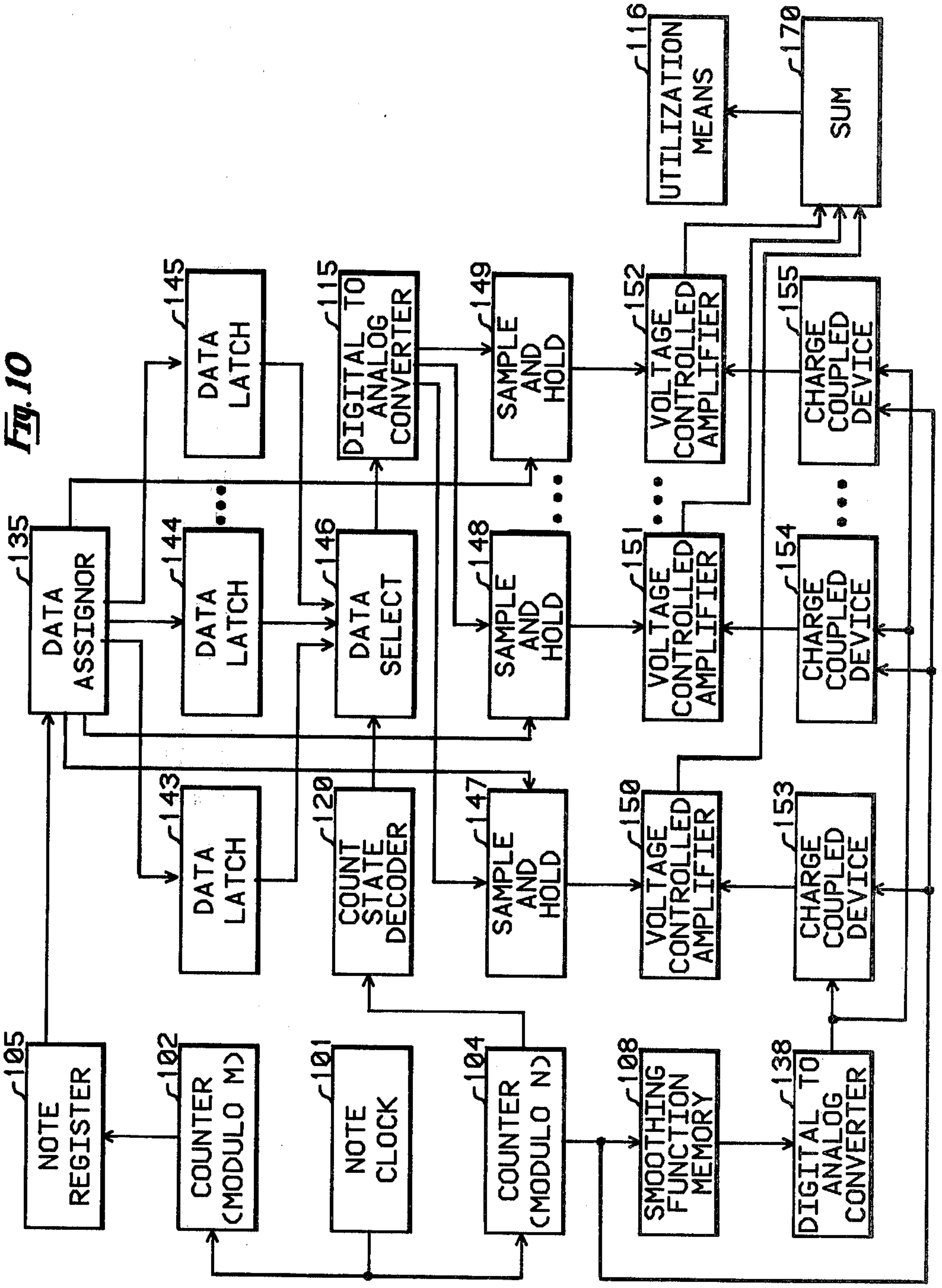
FIG. 10 is a schematic diagram of an alternative implementation in which charge coupled devices are used for the data smoothing.

FIG. 10 shows another alternative implementation to the system shown in FIG. 8. This alternative reduces the number of digital-to-analog converters to two. The system shown in FIG. 10 is described for smoothing over the most recent 8 data points. This is not a limitation of the invention as the extension is apparent for other numbers of data points.

The most recent eight data points read out of the note register 105 are assigned to one of the set of eight data latches by the data assigner 135 in the manner already described. As each new data point is sent to its assigned data latch, the digital-to-analog converter 115 converts the digital number to a corresponding analog signal. These analog signals are stored in a set of eight sample and hold devices shown symbolically as 147 through 149. The selection of the proper sample and hold is made in response to selection signals created by the data assignor 135. The selection is accomplished so that a particular sample and hold device corresponds to a particular data latch.

The smoothing function data is computed according to Equation 5 and are stored in the smoothing function memory 108 as digital numbers.

The smoothing data in the smoothing function memory is read out in response to the states of the counter 104 which is incremented by the note clock 101 and counts modulo 8.

Counter 102 which is used to access data from the note register 105 is incremented by the note clock 101 and counts modulo 64.

The accessed smoothing function data is converted to analog signals by means of the digital-to-analog converter 138. The resulting analog devices. Advantageously the analog storage can be implemented by using charge coupled devices shown symbolically as the set of 8 devices 153 through 155. The analog signals corresponding to the digital data read out of the smoothing function memory are loaded in such a manner that the 8 point data offset, or phase difference, is obtained as previously described.

The data stored in each of the charge coupled devices is advanced at the same rate as data is read out of the smoothing function memory 108.

The set of 8 voltage controlled amplifiers, shown symbolically as 150 through 152, function as analog signal multipliers to multiply the analog data points stored in the corresponding sample and hold devices with the values of the data smoothing signals read out from the charge coupled devices.

The analog signals, or product values, from each of the set of voltage amplifiers 150 are added together in sum 170 to form a smoothed analog signal which is and transmitted to the utilization means 116.

Figure 11:
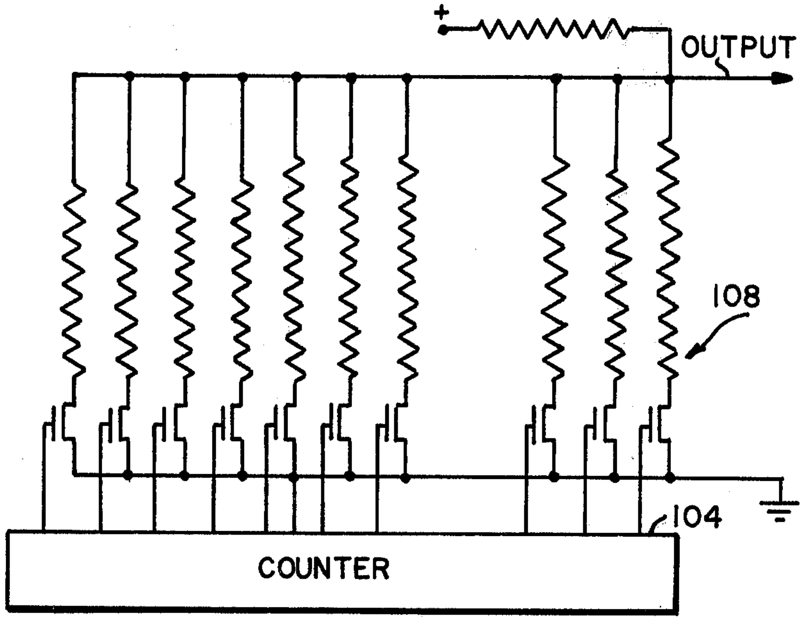
FIG. 11 illustrates the details of a charge coupled device used as a filter.

FIG. 11 shows a typical method of storing data in an analog form. This method is essentially one of having a switchable selectable set of voltages, or current dividers. Such analog memories can be used to replace digital memories such as the smoothing function memory 108 shown in FIG. 10.

Figure 13:
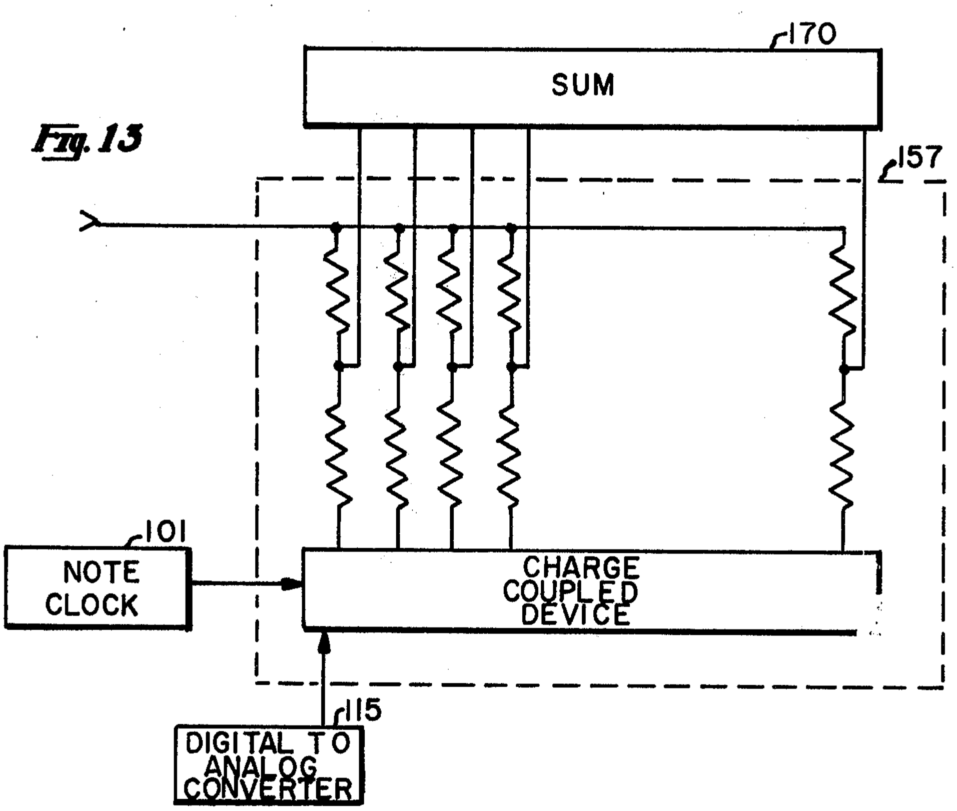
FIG. 13 illustrates the details of the smoothing filter shown in FIG. 12.
Figure 12:
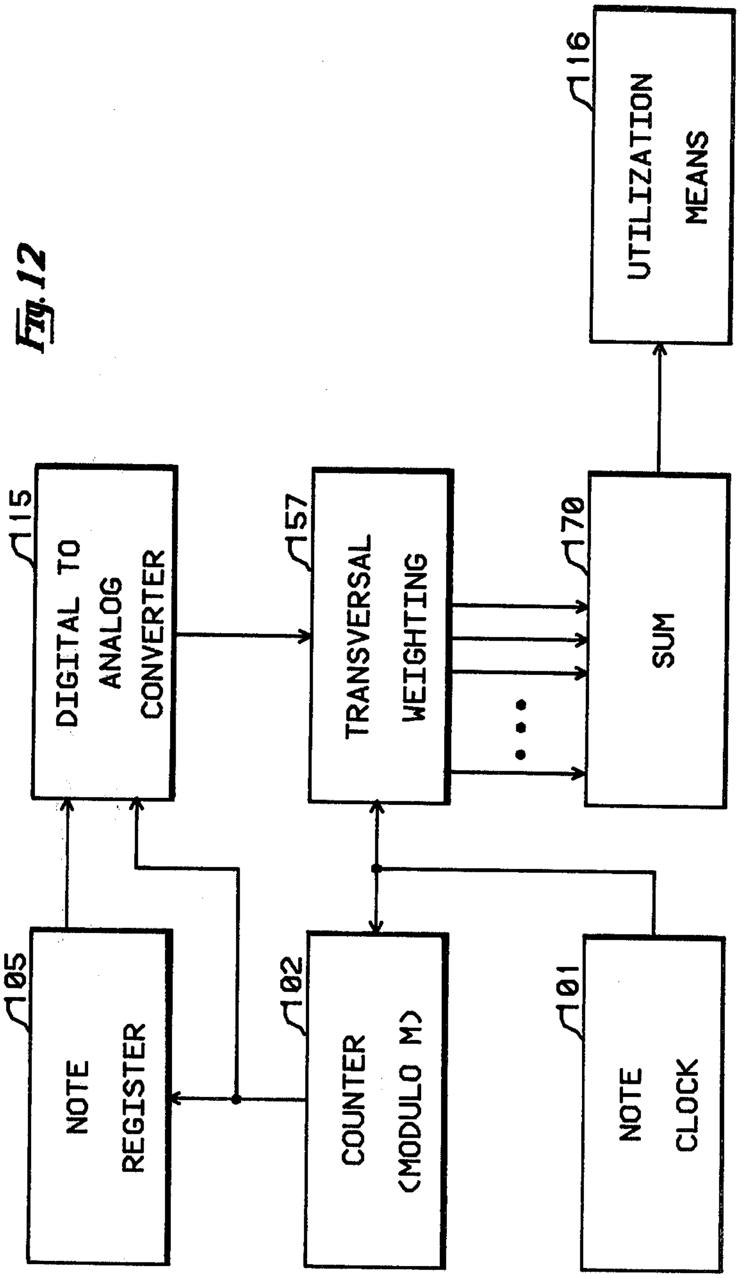
FIG. 12 is an alternative implementation to the system shown in FIG. 10 in which a single smoothing filter is employed.

FIG. 12 shows a preferred embodiment which is an alternative to the system shown in FIG. 10. The digital data addressed out from the note register 105 is converted to corresponding analog signals by means of digital-to-analog converter 115. The resulting analog signals are transferredto the input of the transversal weighting 157. The details of the transversal weighting are shown in FIG. 13 and described below. The output signals from the transversal weighting are added together in sum 170 and sent to the utilization means 116.

FIG. 13 shows an implementation for the transversal weighting. The analog signals from the digital-to-analog converter are connected to the input terminal of a charge coupled device. If the data smoothing is implemented for the 8 most recent data points accessed from the note register 105, the charge coupled device will have 64 positions. The input data is advanced along the charge coupled device at the note clock rate which is eight times higher than the rate at which data is read out of the note register and converted by the digital-to-analog converter.

Figure 3:
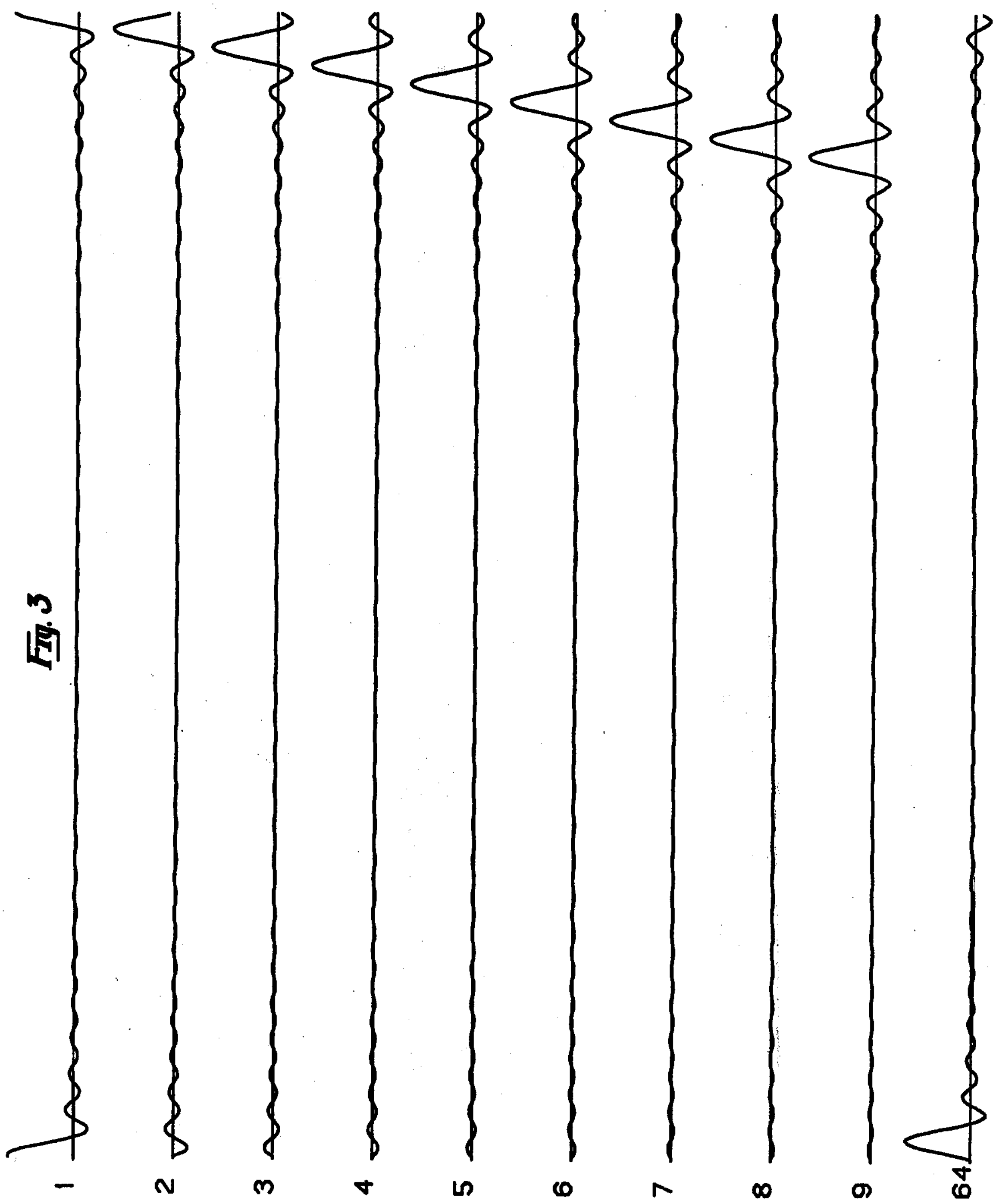
FIG. 3 is a drawing which illustrates the phase relations between the data smoothing functions.

The register divider network connected to the output terminals, or signal ports, of the charge coupled device are designed to produce voltages having the relative amplitudes computed according to Equation 5 with an offset corresponding to the top curve of FIG. 3.

While all the systems used to illustrate the invention were discussed using the preferred smoothing function of the sin x/x form, it is obvious that other smoothing functions can be employed and the invention is not limited to the sin x/x function. For example, the $J_0(x)$ function can also be used. $J_0(x)$ denotes the Bessel function of zero order and argument x. This Bessel function resembles the sinx/x function and has its first zero at the value of the argument $x=2.40483$. To obtain data smoothing values for use with a system which operates on the 8 most recent points, the interval $x=2.40483$ is divided into 8 equal segments to determine the intervals at which the Bessel function is to be evaluated to obtain the set of smoothing function points.

It is obvious that in each of the systems shown and described to illustrate the invention it is not mandatory that the input data be contained in a device such as a note register which is cyclically and repetitively addressed to serve as a data source. The invention is also applicable to non-musical digital systems in which a sequence of digital data is convererted into analog signals.

I claim:

1. In a musical instrument having a waveshape memory storing a plurality of data points corresponding to the amplitudes of a corresponding number of evenly spaced points defining a cycle of an audio musical signal and in which said data points are sequentially and repetitively read out of the waveshape memory and transferred to a digital-to-analog converter at a rate proportional to the pitch of the musical tone being generated, apparatus for reducing undesired frequency components in the musical tone comprising;

a waveshape memory storing said plurality of waveshape data points, note clock means for generating timing signals at a rate proportional to the pitch of the musical tone, assignor means responsive to said timing signals whereby a predetermined number M of said data points are addressed out in a consecutive order from said waveshape memory and wherein the memory address of the first said addressed data point is advanced modulo the number of data points in said plurality of waveshape data points in response to said timing signal, a plurality of memories each storing identical sets of smoothing function data values wherein said plurality of memories is equal to said predetermined number M, addressing means responsive to said timing signals for addressing smoothing function data values from said plurality of memories, a multiplicity of multiplication means wherein said waveshape data points addressed out from said waveshape memories are multiplied by said smoothing function data values addressed out from said plurality of memories, a summing means for adding all the product values from the totality of said multiplicity of multiplication means to create an output set of waveshape data points thereby reducing said undesired frequency components, and a signal conversion means wherein said output set of waveshape data points is converted to an analog waveform.

2. A musical instrument according to claim 1 wherein said plurality of memories stores smoothing function data values computed according to the relation $$x_n=\sin(\pi n/M)/(\pi n/M)$$

where n is the index for each address in a member of said plurality of memories and M is the number of memories in the plurality of memories.

3. A musical instrument according to claim 1 wherein said plurality of memories store smoothing function data values computed from values of the Bessel function $J_0(A)$ for increments of A equal to 2.4083/M where M is the number of memories in the plurality of memories.

4. A musical instrument according to claim 1 wherein the plurality of data words defining a cycle of the audio signal is a set of N values and wherein said plurality of memories comprises;

a multiplicity of M memory means each corresponding to one of said plurality of memories and each containing identical sets of N smoothing function data values wherein each said smoothing function data value is stored at a memory address (n+jh) where j is an index designating a member of said plurality of memories, n is an index in the range 1,2, . . . , N, h is a phase offset number value, and (n+jh) is a number modulo N.

5. A musical instrument according to claim 1 wherein the plurality of data words defining a cycle of the audio signal is a set of N values and wherein said addressing means further comprises;

phase addressing means whereby smoothing function data addressed out from a plurality of M memories each storing identical sets of said smoothing function data are addressed out in a sequence of values according to the memory address index number (n+jh) and j is an index designating a member of the plurality of memories, n is the sequence index number, h is a phase offset number value, and (n+jh) is a number modulo N.

6. A musical instrument according to claim 1 wherein the plurality of data words defining a cycle of the audio signal is a set of N values and wherein said assignor means further comprises;

assignment circuitry for transferring the M data words addressed out from said waveshape memory in a cyclic order to members of said plurality of multipliers.

7. In a musical instrument having a waveshape memory storing a plurality of data words corresponding to the amplitudes of N evenly spaced points defining a cycle of a musical waveshape and in which said data words are sequentially and repetitively read out of the waveshape memory and transferred to a digital-to-analog converter at a rate proportional to the pitch of the musical tone being generated apparatus for reducing undesired frequency components in the audible musical signal comprising;

a smoothing memory for storing smoothing function data values, note clock means for generating timing signals at a rate proportional to the pitch of the musical tone, assignor means responsive to said timing signals whereby a sequence of a predetermined number n of said data points are repetitively addressed out in consecutive order from said waveshape memory and wherein the memory address of the first member of said sequence of addressed data points is advanced modulo the number of data points in said plurality of waveshape data points in response to said timing signals, phase addressing means responsive to said timing signals whereby a sequence of smoothing function data values are addressed out from said smoothing function memory according to an index number (i+jh) which is a number modulo said number N, j is a device number having integer values in the range of 1 to said number n, i is the index number of said sequence of consecutive data points addressed out from said waveshape memory, and the constant h is a phase offset number, a plurality of multiplication means, of said number n and each designated by said device number j wherein each of said data words addressed out by said phase addressing means is multiplied by a corresponding one of said data words addressed out by said assignor means, a summing means for adding all the product values produced by said plurality of multiplication means to create an output set of waveshape points thereby reducing said undesired frequency components, and a signal conversion means wherein the output of said summing means is converted to an analog signal waveform.

8. A musical instrument according to claim 7 wherein said smoothing function memory stores smoothing function data computed according to the relation $$x_n = \sin(\pi n/M)/(\pi n/M)$$

where n is the index for each address in the smoothing function memory and M is the number of members in said multiplicity of multipliers.

9. In a musical instrument having a waveshape memory storing a plurality of data words corresponding to the amplitudes of N evenly spaced points defining a cycle of a musical waveshape and in which said data words are sequentially and repetitively read out of the waveshape memory and transferred to a digital-to-analog converter at a rate proportional to the pitch of the musical tone being generated apparatus for reducing undesired frequency components in the audible musical signal comprising;

a smoothing memory for storing smoothing function data values, note clock means generating timing signals at a rate proportional to the pitch of the musical tone, a data storage means for storing data words addressed out from said waveshape memory, data storage select means responsive to said note clock means wherein a sequence of j consecutive data words are repetitively addressed out from said waveshape memory according to an index number i and are stored in said data storage means, wherein the memory address of the first addressed data word in said sequence is advanced in response to said note clock means, phase addressing means responsive to said note clock means whereby a sequence of smoothing function data are addressed out from said smoothing function memory according to an index number (i+jh) which is a number modulo said number N, the constant n is a phase offset number and whereby said addressed smoothing function data are provided as output data, a multiplier means for forming the multiplied values of said output data data from said phase addressing means with the corresponding data words stored in said data storage means, a summing means for adding the multiplied product values provided by said multiplier means to create an output set of waveshape data points thereby reducing said undesired frequency components, and a signal conversion means wherein the output of said summing means is converted to an analog signal waveform.

10. A musical instrument according to claim 9 wherein said data storage select means further comprises;

modulo addressing circuitry whereby said consecutive data words are accessed from said waveshape memory at addresses modulo said number N of points defining a cycle of a musical waveshape, data replacement circuitry responsive to said note clock means whereby data addressed out from said waveshape memory are stored in a cyclic sequence of memory addresses in said data storage means, and data addressing means responsive to said note clock means whereby data stored in said data storage select means are cyclically addressed out and transferred to said multiplier means.

11. A musical instrument according to claim 9 when said summing means further comprises;

an adder-accumulator means for adding and accumulating the sum of said number j of products provided by said multiplier means and transferring the sum to said signal conversion means and wherein the contents of the adder-accumulator are initialized after each said transfer in response to said note clock means.

12. In a musical instrument having a waveshape memory storing a plurality of data words corresponding to the amplitudes N evenly spaced points defining a cycle of a musical waveshape and in which said data words are sequentially and repetitively read out of the waveshape memory at a rate proportional to the pitch of the musical tone being generated apparatus for reducing undesired frequency components in the audible musical signal comprising;

a smoothing function memory for storing smoothing function data values, a multiplicity of first signal conversion means for converting digital data values to analog output signals, data assignor means whereby data words addressed out from said waveshape memory are assigned in cyclic order to members of said multiplicity of first signal conversion means, a multiplicity of second signal conversion means, each member of which corresponds to a member of said multiplicity of first signal conversion means, for generating second output analog signals having magnitudes corresponding to the product of said analog output signals and said smoothing function data values, phase addressing means whereby smoothing function data values stored in said smoothing function memoty are addressed out and transferred to members of said multiplicity of second signal conversion means, and a summing means for adding said second output analog signals from said multiplicity of second signal conversion means thereby reducing said undesired frequency components.

13. A musical instrument according to claim 12 wherein said phase addressing means further comprises phase circuitry whereby smoothing function data are addressed out from said smoothing function memory in a sequence of values according to the index number (n+jh) which is a number modulo said number N, n is the sequence index number, h is a phase offset number, and j is a number equal to the multiplicity of said first conversion means.

14. A musical instrument according to claim 12 wherein said multiplicity of second signal conversion means further comprises;

a multiplicity of amplifier circuits for amplifying said analog output signals from said first signal conversion means and wherein each amplifier circuit is responsive to an analog control signal, a smoothing signal conversion means whereby data values addressed out from said smoothing function memory are converted into analog control signals and transferred to said multiplicity of amplifier circuits.

15. In a musical instrument having a waveshape memory storing a plurality of data words corresponding to the amplitudes of N evenly spaced points defining a cycle of a musical waveshape and in which said data words are sequentially and repetitively read out of the waveshape memory at a rate proportional to the pitch of the musical tone being generated apparatus for reducing undesired frequency components in the audible musical signal comprising;

a note clock timing means wherein timing clock signals are generated, waveshape memory addressing means responsive to said timing clock signals for addressing data words out of said waveshape memory, a signal conversion means whereby data points addressed out of said waveshape memory are converted into analog signals, memory means storing smoothing function values, analog signal storage means wherein said analog signals are stored, data weighting means wherein analog signals stored in said analog storage means are multiplied by smoothing data values from said memory means to provide smoothed analog signals, and summing means wherein all said smoothed analog signals are added together thereby reducing undesired frequency components in the summed musical signal.

16. A musical instrument according to claim 15 wherein said analog signal storage means comprises a charge coupled device responsive to said timing clock signals.

17. A musical instrument according to claim 16 wherein said data weighting means comprises a multiplicity of electrical resistors each connected to an output of said charge coupled device.

* * * * *

UNITED STATES PATENT AND TRADEMARK OFFICE
CERTIFICATE OF CORRECTION

PATENT NO. : 4,245,541

DATED : January 20, 1981

INVENTOR(S) : Ralph Deutsch

It is certified that error appears in the above-identified patent and that said Letters Patent are hereby corrected as shown below:

Column 9, line 66, after "analog" add -- signals are loaded into selected members of a set of analog storage --.

Column 13, line 44, change "n" to -- h --.

Signed and Sealed this

*Twenty-first* Day of *April 1981*

[SEAL]

*Attest:*

RENE D. TEGTMEYER

*Attesting Officer* *Acting Commissioner of Patents and Trademarks*